(12) United States Patent
Gray et al.

(10) Patent No.: US 12,073,083 B2
(45) Date of Patent: Aug. 27, 2024

(54) SELF-INSULATING HIGH BANDWIDTH EXTERNAL MEDIA STORAGE DEVICE

(71) Applicant: Northrop Grumman Systems Corporation, Falls Church, VA (US)

(72) Inventors: Andrew C. Gray, Falls Church, VA (US); Kevin D. Claycomb, Falls Church, VA (US); James R. Windgassen, Falls Church, VA (US); Kevin Gallagher, Falls Church, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 17/576,127

(22) Filed: Jan. 14, 2022

(65) Prior Publication Data
US 2023/0229314 A1 Jul. 20, 2023

(51) Int. Cl.
| | |
|---|---|
| G06F 3/06 | (2006.01) |
| G02B 6/38 | (2006.01) |
| G02B 6/42 | (2006.01) |
| G06F 1/16 | (2006.01) |
| G06F 1/18 | (2006.01) |
| G06F 1/26 | (2006.01) |
| G06F 3/16 | (2006.01) |
| H02G 9/00 | (2006.01) |

(52) U.S. Cl.
CPC ............ *G06F 3/0613* (2013.01); *G06F 1/266* (2013.01); *G06F 3/0659* (2013.01); *G06F 3/067* (2013.01); *H02G 9/00* (2013.01)

(58) Field of Classification Search
CPC ................................ B63B 35/04; H02J 50/90
See application file for complete search history.

(56) References Cited

U.S. PATENT DOCUMENTS

| | | | |
|---|---|---|---|
| 5,687,137 | A | 11/1997 | Schmidt et al. |
| 5,772,457 | A | 6/1998 | Cairns |
| 6,511,335 | B1 | 1/2003 | Rayssiguier et al. |
| 6,736,545 | B2 | 5/2004 | Cairns et al. |
| 7,731,515 | B2 | 6/2010 | Nicholson |

(Continued)

FOREIGN PATENT DOCUMENTS

| | | |
|---|---|---|
| CN | 108123753 A | 6/2018 |
| WO | 2010124165 A1 | 10/2010 |

OTHER PUBLICATIONS

International Search Report and Written Opinion in corresponding International Application No. PCT/US22/53610, mailed Mar. 22, 2023, 12 pages.

*Primary Examiner* — Getente A Yimer
(74) *Attorney, Agent, or Firm* — Dority & Manning, P.A.

(57) ABSTRACT

A data storage system including a docking station, and a dockable external data storage device operates in an underwater environment. The dockable external data storage device includes a housing, a memory disposed within the housing to store data, and a connector assembly mounted on the housing. The connector assembly includes at least one optical transmitter configured to transfer data from the memory to a corresponding optical receiver in the docking station. The connector assembly also includes a self-passivating electrical contact configured to transfer electrical power to the dockable external data storage device from a corresponding power contact in the docking station.

21 Claims, 4 Drawing Sheets

(56) References Cited

U.S. PATENT DOCUMENTS

| | | | |
|---|---|---|---|
| 9,197,006 B2 | 11/2015 | Hack | |
| 9,893,460 B2 | 2/2018 | Windgassen et al. | |
| 10,128,909 B2 | 11/2018 | Weaver et al. | |
| 10,355,334 B2 | 7/2019 | Bokenfohr et al. | |
| 10,868,384 B1 | 12/2020 | Windgassen et al. | |
| 11,005,390 B2 | 5/2021 | Windgassen et al. | |
| 11,038,594 B1 | 6/2021 | Claycomb et al. | |
| 11,069,995 B1 | 7/2021 | Hack et al. | |
| 11,586,198 B2 * | 2/2023 | Mukaida | G05D 1/10 |
| 2016/0100012 A1 | 4/2016 | Haugseth et al. | |
| 2016/0233607 A1 | 8/2016 | Windgassen et al. | |
| 2016/0272291 A1 * | 9/2016 | Outa | G05D 1/10 |
| 2017/0043966 A1 * | 2/2017 | Witelson | A61L 2/10 |
| 2017/0045026 A1 * | 2/2017 | Fang | F03B 13/00 |
| 2017/0207658 A1 * | 7/2017 | Bana | H02J 50/90 |
| 2019/0031307 A1 | 1/2019 | Siersdorfer | |
| 2022/0144395 A1 * | 5/2022 | Kocak | G01S 5/06 |

* cited by examiner

SELF-INSULATING HIGH BANDWIDTH EXTERNAL MEDIA STORAGE DEVICE

FIELD OF INVENTION

The present invention relates to electrical connectors and components for use in adverse environments.

BACKGROUND

Traditional methods for offloading data from undersea platforms include direct data transfer through a data cable, retrieval and disassembly of the host platform to physically remove the storage media, and external mounting of a removable and waterproof storage device. Waterproof cables used to transfer data directly from the host platform may require a user to physically connect the cable and wait for the data to transfer before disconnecting. Connecting cables in an underwater environment typically uses a wet mate connector, which may not be capable of maintaining a controlled impedance through the signal lines, limiting the data rate through the cable.

SUMMARY

The techniques presented herein provide for an underwater data storage system. In an exemplary configuration, the underwater data storage system includes a docking station, and a dockable external data storage device. The dockable external data storage device comprises a housing, a memory disposed within the housing to store data, and a connector assembly mounted on the housing. The connector assembly includes at least one optical transmitter configured to transfer data from the memory to a corresponding optical receiver in the docking station. The connector assembly also includes a self-passivating electrical contact configured to transfer electrical power to the dockable external data storage device from a corresponding power contact in the docking station.

In some aspects, the techniques described herein relate to an underwater data storage system, further including at least one of a visual indicator and/or an acoustic indicator to indicate a successful docking operation between the dockable external data storage device and the docking station.

In some aspects, the techniques described herein relate to an underwater data storage system, further including a locking mechanism to secure the dockable external data storage device to the docking station.

In some aspects, the techniques described herein relate to an underwater data storage system, further including a data processor configured to adapt the data stored in the memory to a communication protocol associated with the docking station.

In some aspects, the techniques described herein relate to an underwater data storage system, wherein the self-passivating electrical contact includes an electrically conductive material that forms an electrically insulating passivation layer when exposed to the underwater environment.

In some aspects, the techniques described herein relate to an underwater data storage system, wherein the electrically conductive material is selected from a group containing niobium, tantalum, titanium, zirconium, molybdenum, ruthenium, rhodium, palladium, hafnium, tungsten, rhenium, osmium, and iridium.

In some aspects, the techniques described herein relate to an underwater data storage system, wherein the at least one optical transmitter is configured to transfer data to the corresponding optical receiver through the underwater environment.

In some aspects, the techniques described herein relate to a dockable external data storage device including a housing configured to operate in an underwater environment, a memory disposed within the housing to store data, and a connector assembly mounted on the housing. The connector assembly includes at least one optical transmitter configured to transfer data from the memory to a corresponding optical receiver in a docking station, and a self-passivating electrical contact configured to transfer electrical power to the dockable external data storage device from a corresponding power contact in the docking station.

In some aspects, the techniques described herein relate to a dockable external data storage device, further including at least one of a visual indicator and/or an acoustic indicator to indicate a successful docking operation between the dockable external data storage device and the docking station.

In some aspects, the techniques described herein relate to a dockable external data storage device, further including a locking mechanism to secure the dockable external data storage device to the docking station.

In some aspects, the techniques described herein relate to a dockable external data storage device, further including a data processor configured to adapt the data stored in the memory to a communication protocol associated with the docking station.

In some aspects, the techniques described herein relate to a dockable external data storage device, wherein the self-passivating electrical contact includes an electrically conductive material that forms an electrically insulating passivation layer when exposed to the underwater environment.

In some aspects, the techniques described herein relate to a dockable external data storage device, wherein the electrically conductive material is selected from a group containing niobium, tantalum, titanium, zirconium, molybdenum, ruthenium, rhodium, palladium, hafnium, tungsten, rhenium, osmium, and iridium.

In some aspects, the techniques described herein relate to a dockable external data storage device, wherein at least one optical transmitter is configured to transfer data to the corresponding optical receiver through the underwater environment.

In some aspects, the techniques described herein relate to a method including docking an external data storage device with a host docking station in an underwater environment, providing power to the external data storage device from the host docking station via a self-passivating electrical contact, and transferring data to the external data storage device from the host docking station via optical transceivers.

In some aspects, the techniques described herein relate to a method further including confirming docking of the external data storage device with the host docking station by a visual and/or acoustic indicator to indicate a successful docking.

In some aspects, the techniques described herein relate to a method further including securing the external data storage device to the host docking station with a locking mechanism.

In some aspects, the techniques described herein relate to a method further including adapting the data stored in a memory of the external data storage device to a transport protocol associated with the host docking station.

In some aspects, the techniques described herein relate to a method further including undocking the external data storage device from the host docking station, and docking the external data storage device to a user docking station in the underwater environment.

In some aspects, the techniques described herein relate to a method, further including undocking the external data storage device from the host docking station, and docking another external data storage to the host docking station in the underwater environment.

In some aspects, the techniques described herein relate to a method, further including transferring additional data to the external data storage device from the host docking station by superimposing a data signal over the power provided via the self-passivating electrical contact.

The techniques presented herein provide advantages for users in undersea operations to be able to retrieve data from submerged platforms. The techniques presented herein enables the users to quickly retrieve a large amount of data without remaining on site to transfer the data over a direct cable connection. Additionally, the techniques presented herein provide for sealed data storage devices that can be swapped out to provide near-continuous operation of the host platforms. Further, the external data storage device provides for positive control of sensitive data that may be collected by the host platforms.

DETAILED DESCRIPTION

Figure 1:
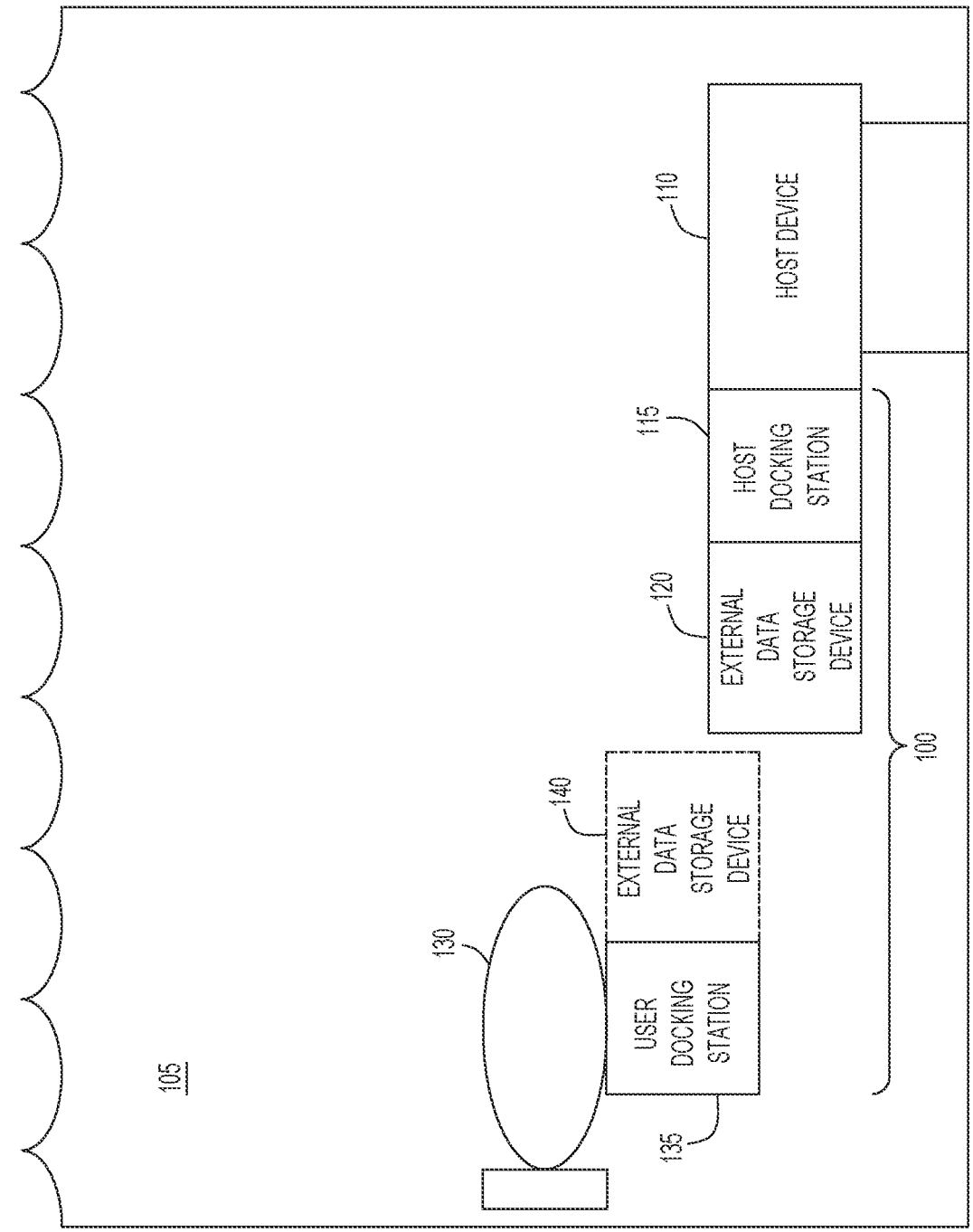
FIG. 1 is a system diagram of an underwater data storage system according to one embodiment.

Traditional wet-mate, external waterproof storage devices may be used on undersea platforms to facilitate the process of offloading data. When handling large amounts of data, users may find removing the storage device containing the data to be more convenient than offloading the data via a direct communication link. However, traditional wet-mate, waterproof storage devices are typically constrained in data rate (e.g., 1 Gbps or less), have a limited number of matings (e.g., due to seal breakdown), and may be constrained in the protocol used to transfer data between the storage device and the host platform.

The constrained data transfer rate limits the usefulness of the storage device as undersea systems technologically advance and produce larger quantities of data in a shorter period of time. For host platforms that generate a large amount of data (e.g., sonar systems), the time required to transfer the data over a typical 1 Gbps underwater cable may approach the same amount of time required to record the data. In other words, the data recorded in five hours may take an additional five hours to transfer over a typical cable with a wet mate connector.

Additionally, the limited number of matings further restricts the usefulness of the storage device by reducing the operational lifetime. Further, a fixed transfer protocol forces the user to adapt their platform to meet the requirements of the typical storage device.

The techniques presented herein provide for a data storage device designed to function indefinitely in an undersea domain. The device combines self-passivating power contacts and optical data transmission to enable rapid transfer of large data sets with a nearly unlimited number of wet mate connections between the host platform and the storage device. Low power, embedded processors allow the data storage device to emulate communication protocols, such as Ethernet, Universal Serial Bus (USB), and/or Peripheral Component Interconnect (PCI) Express.

In one example, a user may set an operating mode of the data storage device with a user docking station and a computing device including selecting the protocol used by a host platform. After programming the data storage device, the data storage device may be placed on the host platform with a host docking station and the host platform may be deployed. Once the mission of the host platform is complete, the data storage device may be physically undocked from the host platform, and the user docking station and computing device may rapidly transfer the recorded data off the data storage device.

The modular, programmable nature of the data storage device allows a user to use the same data storage device for multiple missions on different host platforms. Additionally, multiple data storage devices may be programmed for use on the same host platform. For instance, once one data storage device has reached the capacity of the storage media, another data storage device may be swapped on the host platform to continue recording data without ending the mission of the host platform.

The data storage device described herein is capable of rapidly transferring large amounts of data, is rated for a nearly unlimited number of matings, and may emulate various high-speed data transfer communication protocols, as needed. In one example, the data storage device described herein may address a growing need for faster and larger capacity underwater storage devices to meet the larger quantities of data produced by advancing undersea technology. The data storage device includes an external data storage device, a host docking station, and a user docking station with user software.

Referring now to FIG. 1, an example of an underwater data storage system 100 in an underwater environment 105 is shown. The system 100 includes a host docking station 115, a user docking station 135, and a dockable external data storage device 120. The host docking station 115 is configured to couple with a host device 110 that operates in the underwater environment 105 and to connect the host device 110 to the dockable external data storage device 120. In one example, the host docking station 115 may be an integral part of the host device 110. For example, the host docking station 115 may be welded, bonded, or formed with the host device 110. Alternatively, the host docking station 115 may be configured to be removable, e.g., bolted or latched to the host device 110 so that it may be removed in a dry, protected environment to prevent corrosion of electrical connectors by an undersea environment. In one example, the host device 110 may be a sonar recorder, an autonomous vehicle, a scientific data recorder, or other data collecting equipment that operates in an undersea environment.

To retrieve data from the external data storage device 120, a user 130 (e.g., in a submersible vehicle) may bring a user docking station 135 to the host device 110. The user 130 detaches the external data storage device 120 from the host docking station 115 on the host device 110 and attaches the external data storage device 120 to the user docking station 135. The user docking station 135 may attach to the same connector(s) on the external data storage device 120 as the user docking station 135. Alternatively, the external data storage device 120 may include a different set of connector(s) for the user docking station 135 and the host docking station 115.

In one example, the user 130 may transfer data from the external data storage device 120 to another storage medium, e.g., within a submersible vehicle, through the user docking station 135 and return the external data storage device 120 to the host docking station 115. Alternatively, the user 130 may bring a replacement external data storage device 140 and swap the external data storage device 120 with the replacement external data storage device 140. In one example, the replacement external data storage device 140 may include the same, or substantially the same, components as the external data storage device 120. In another example, the configuration of one or more of the components of the replacement external data storage device 140 may differ from those in the external data storage device 120. For example, the replacement external data storage device 140 may include a different housing, a different processor, a different memory, and/or different protocol logic than the external data storage device 120.

In one example, the external data storage device 120 may include a self-passivating power connector, a high bandwidth data connector, a low-power embedded processor, and one or more computer readable storage media (e.g., solid state drives). The self-passivating power connector and the high bandwidth data connector may replace a traditional, bulky wet-mate connector, which would be rated for a limited number of matings with a constrained data transfer speed. In one example, the self-passivating power connector on the external data storage device 120 may be configured to mate with a corresponding contact on the host docking station 115 and/or the user docking station 135 (see, e.g., FIG. 3).

The high bandwidth data connector may be an optical data connector that is configured to communicate data via Wavelength Division Multiplexing (WDM) or Dense Wavelength Division Multiplexing (DWDM). Optical data connections may replace traditional electrically conductive data connectors to enable Free Space Optical (FSO) communication through the underwater environment. FSO communication allows the data connectors to be more tolerant of dirt, dust, particulates, and/or misalignment in comparison to fiber communication. The use of FSO methods to transfer data provides a higher performance data channel than passing electrical signals via conduction in connector pins by avoiding the signal integrity challenges or traditional underwater connectors. The light from the FSO communication passes through the operational medium of the underwater environment, which may include water, fuel, oil, air, and other natural or man-made contaminants.

The low-power embedded processor in the external data storage device 120 may include one or more microprocessors, microcontrollers, and/or electronic circuitry configured to process software instructions and/or data. The low-power embedded processor may draw a low current enabling the embedded processor to be powered by a battery or other self-contained power source (e.g., fuel cell) that is connected to the external data storage device 120. The battery or power source may be directly mounted in the external data storage device 120, or mounted in the host docking station 115, the host device 110, the user docking station 135, or a device carrying the user 130.

In another example, electrical power may be transferred between the external data storage device 120 and the host docking station 115 or the user docking station 135 using a power connector constructed using self-passivating, corrosion-resistant transition metals. A small amount of abrasion (e.g., on the atomic level) overcomes the insulating passivation layer to make electrical contact to provide power to the external data storage device 120. The tiny amount of abrasion, when coupled with the use of non-contact optics, allows for a nearly unlimited number of matings. Power from the host device 110 may be transferred through the self-passivating contacts to a low-power embedded processor and data storage hardware in the external data storage device 120.

The contacts of the power connector may be constructed entirely of self-passivating transition metals or they may be constructed of other materials that are coated with self-passivating transition metals (e.g., as shown and described in U.S. Pat. No. 10,868,384, which is incorporated by reference herein). Some examples of materials that are self-passivating in water include niobium, tantalum, titanium, zirconium, molybdenum, ruthenium, rhodium, palladium, hafnium, tungsten, rhenium, osmium, and iridium. Each of these materials react with water to form an electrically insulating passivation layer when exposed to a water environment. The passivation layer may be oxides, hydroxides, or other compounds that form by reacting the self-passivating material with an adverse environment. Since self-passivating materials may be more expensive than other materials, such as copper, which are typically used for electrical contacts, one contact may be constructed using a self-passivating material and the other contact may be constructed using a less expensive material like copper (e.g., as described in U.S. Pat. No. 11,069,995, which is incorporated by reference herein).

Figure 2:
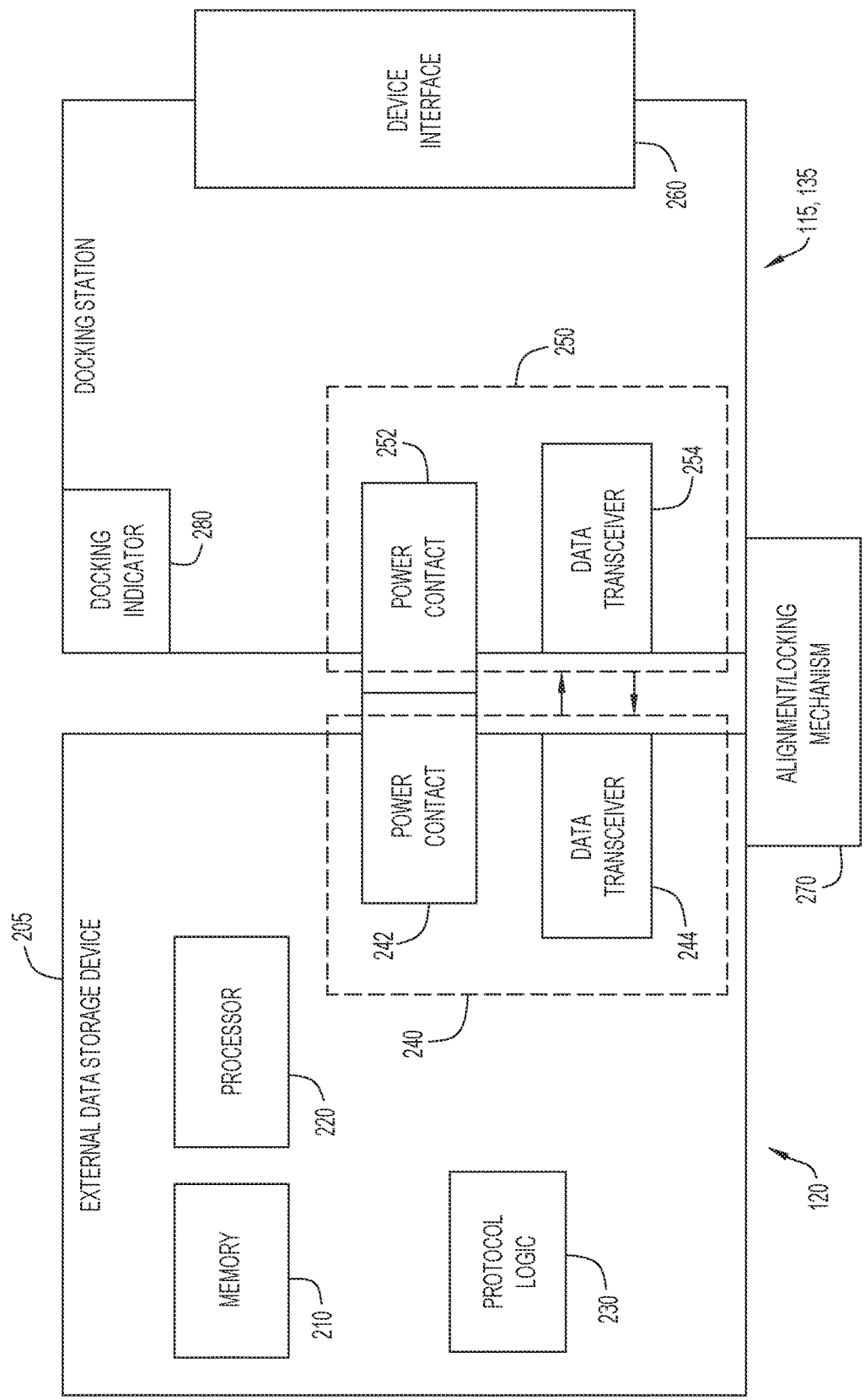
FIG. 2 is a block diagram of one example of an external data storage device connecting to an underwater docking station.

Referring now to FIG. 2, a simplified block diagram illustrates an example of the connection between the external data storage device 120 and the host docking station 115. The user docking station 135 may include similar features to the host docking station 115, and a connection similar to that shown in FIG. 2 may also be used to connect the external data storage device 120 and the user docking station 135. The external data storage device 120 includes a housing 205 and further includes a memory 210, a processor 220, and protocol logic 230 disposed within the housing and a connector assembly 240 mounted on the housing. The housing is preferably constructed to be watertight and to withstand water pressure at the depths at which the device is intended to operate (e.g., on the continental shelf or the ocean floor). The memory 210, processor 220, and protocol logic 230 may communicate with each other and/or the components of the connector assembly 240 through connections (e.g., wire traces, one or more communication buses, etc.) in the external data storage device 120.

The memory 210 is configured to store data, information, software, and/or instructions associated with external data storage device 120, and/or logic configured for memory 210. The memory 210 may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory." The memory 210 may include nontransitory memory elements, which may store instructions that are executed to perform one or more of the techniques described herein. Data/information being tracked and/or sent to one or more entities as discussed herein could be provided in any database, table, register, list, cache, storage, and/or storage structure: all of which can be referenced at any suitable timeframe. Any such storage options may also be included within the broad term "memory" as used herein. A "memory" may include one or more memory devices of the type described herein.

In at least one embodiment, the processor 220 includes at least one hardware processor configured to execute various tasks, operations and/or functions for external data storage device 120 as described herein according to software and/or instructions configured for external data storage device 120. Processor 220 (e.g., a hardware processor) can execute any type of instructions associated with data to achieve the operations detailed herein. In one example, the processor 220) can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'. In one example, the processor 220 may encrypt/decrypt data or control different levels of Redundant Array of Independent Disks (RAID) in the memory 210.

The protocol logic 230 is configured to enable the processor 220 to adapt data stored in the memory 210 to a protocol/format usable by entities interfacing with the external data storage device 120 (e.g., the host device 110). The protocol logic 230 may include instructions that, when executed, cause the processor 220 to perform operations, which can include, but not be limited to, adapting data format protocols, interacting with other entities, maintaining and/or interacting with stored data, or other operations for embodiments described herein. In one example, the protocol logic 230) may be firmware within the processor 220 that allows for different forms (e.g., protocols) of communication with the host device 110. The specific protocol may be set for the external data storage device 120 with a user docking station 135. The protocols supported by the protocol logic 230 may include USB, Network Attached Storage (NAS), PCI Express, and/or Serial AT Attachment (SATA), or other suitable protocol.

A connector assembly 240 with a power contact 242 and a data transceiver 244 is mounted on the housing 205 of the external data storage device 120. The connector assembly 240 matches a complementary connector assembly 250 on the host docking station 115, which includes a power contact 252 and a data transceiver 254. In one example, the power contact 242 includes one or more self-passivating contacts that form a thin insulating layer when exposed to an underwater environment. The data transceiver 244 communicates with the complementary data transceiver 254 on the host docking station 115. In one example, the data transceiver 244 and the complementary data transceiver 254 may include optical transmitters and receivers that communicate through the underwater medium. The data transceiver 244 and the complementary data transceiver 254 do not require direct physical contact to communicate data between the host docking station 115 and the external data storage device 120.

The host docking station 115 includes a device interface 260 configured to interface with the host device 110 (not shown in FIG. 2). The device interface 260 may transfer power and/or data between the host device 110 and the host docking station 115. In one example, the device interface 260 may include a waterproof seal between its housing and the host device 110 to prevent the underwater environment from passing into the host device 110. The device interface 260 may include a low-power embedded processor to pass data between the host device 110 and the data transceiver 254. Electrical power from the host device 110 may be passed through the device interface 260 to the power contact 252.

The external data storage device 120 and/or the host docking station 115 may include an alignment/locking mechanism 270 to assist with docking the external data storage device 120 with the host docking station 115. In one example, the alignment/locking mechanism 270 may include pins, posts, rods, or other structural features on one of the devices configured to mate with channels, holes, grooves, or other complementary structural features on the other device when the external data storage device 120 is properly aligned with the host docking station 115. Such structural features may also help guide the devices into proper alignment. For instance, the alignment/locking mechanism 270 may position the connector assembly 240 across from the complementary connector assembly 250. In another example, the alignment/locking mechanism 270 includes locking features (e.g., latches, magnets, etc.) to ensure that the external data storage device 120 is firmly and securely attached to the host docking station 115 and may not be removed without unlocking the alignment/locking mechanism 270.

The host docking station 115 may also include a docking indicator 280 configured to inform a user of a successful installation or removal of the external data storage device 120. The docking indicator 280 allows the user to confirm that the external data storage device 120 is docked in the host docking station 115. In one example, the docking indicator 280 may provide visual or acoustic feedback that is transmitted from the host docking station 115. For instance, the docking indicator 280 may emit a visual signal (e.g., flash a light) or an acoustic signal (e.g., produce an audio tone) through the undersea environment when the external data storage device 120 successfully docks with the host docking station 115. In one example, the docking indicator 280 may include one or more optical emitters (e.g., light-emitting diodes) and/or acoustic transducers (e.g., piezoelectric elements) coupled with a circuit that receives input on docking status from the docking station and/or the external data storage device and is configured to cause the optical and/or acoustic elements to emit a signal when a predetermined docking status is achieved. Docking status may be determined by completing a circuit using proximity sensors in the alignment/locking mechanism, by monitoring voltage on a power contact, by monitoring communications between the external data storage device and the docking station, as well as by other means.

In one example, the docking indicator 280 may encode simple information to indicate different stages of the docking operation. For instance, the docking indicator 280 may flash twice when the alignment/locking mechanism 270 latches, flash three times when the power contact 252 on the host docking station 115 mates with the power contact 242 on the external data storage device 120, and/or flash four times when the data transceiver 254 on the host docking station 115 completes a handshake with the data transceiver 244 on the external data storage device 120.

In another example, the docking indicator 280 may also be used to guide a user towards the host device 110 during an operation to recover data from the external data storage device 120. For instance, the docking indicator 280 may periodically emit a visual or acoustic signal into the undersea environment enabling a user to locate the host docking station 115 that is connected to the host device 110.

Upon successful docking of the external data storage device 120 with the host docking station 115, the docking indicator 280 may cease the periodic broadcast of the visual and/or acoustic signal, at least temporarily, to indicate the successful connection between the external data storage device 120 and the host docking station 115. Alternatively, the docking indicator 280 may display a predetermined sequence (e.g., four flashes in quick succession) to indicate a successful docking operation before resuming the periodic emission of the visual/acoustic signal. In a further example, the external data storage device 120 may include a docking indicator in place of, or in addition to, the docking indicator 280 on the host docking station 115.

In one example, liquid (e.g., seawater) is allowed to enter between the connectors of the host docking station 115 and the external data storage device 120 when connecting and/or disconnecting the external storage device with/from the host docking station. The ability to operate within a natural environment eliminates the need for connector sealing devices that may fail if not properly maintained. Sealing devices, such as gaskets and o-rings may fail over time or be installed incorrectly allowing water to pass. Each successive connection/disconnection of these sealing devices on traditional connectors increases the probability that the seal will fail.

In another example, the user docking station 135 may include similar components to enable a user device (e.g., a user's computer) to connect to the external data storage device 120. The user device may provide power to the user docking station 135 through a data cable, enabling the user docking station 135 to provide power to the external data storage device 120. An embedded processor in the user docking station 135 may coordinate power and/or a high-speed connection (e.g., USB 3.0-4.0, Power over Ethernet, Thunderbolt™, etc.) between the user device and the external data storage device 120. Additionally, the user docking station 135 may communicate with the external data storage device 120 through the optical data connection (e.g., data transceiver 244). Software on the user device may be used to transfer data to or from the external data storage device 120. Additionally, the software on the user device may change the communication protocol of the external data storage device 120 to better match the needs of the user device or the host device 110. This allows the external data storage device 120 to be used for different user devices and host devices that use different communication protocols.

In a further example, additional features, such as RAID, encryption, tamper-resistance, and/or over-write permissions, may also be applied to the external data storage device 120. Additional mechanical features may also be added to the external data storage device 120, the host docking station 115, and/or the user docking station 135 to facilitate autonomous recovery by underwater platforms. For instance, large handles may be added to the external data storage device 120 to assist autonomous systems with the recovery of the external data storage device 120.

Figure 3:
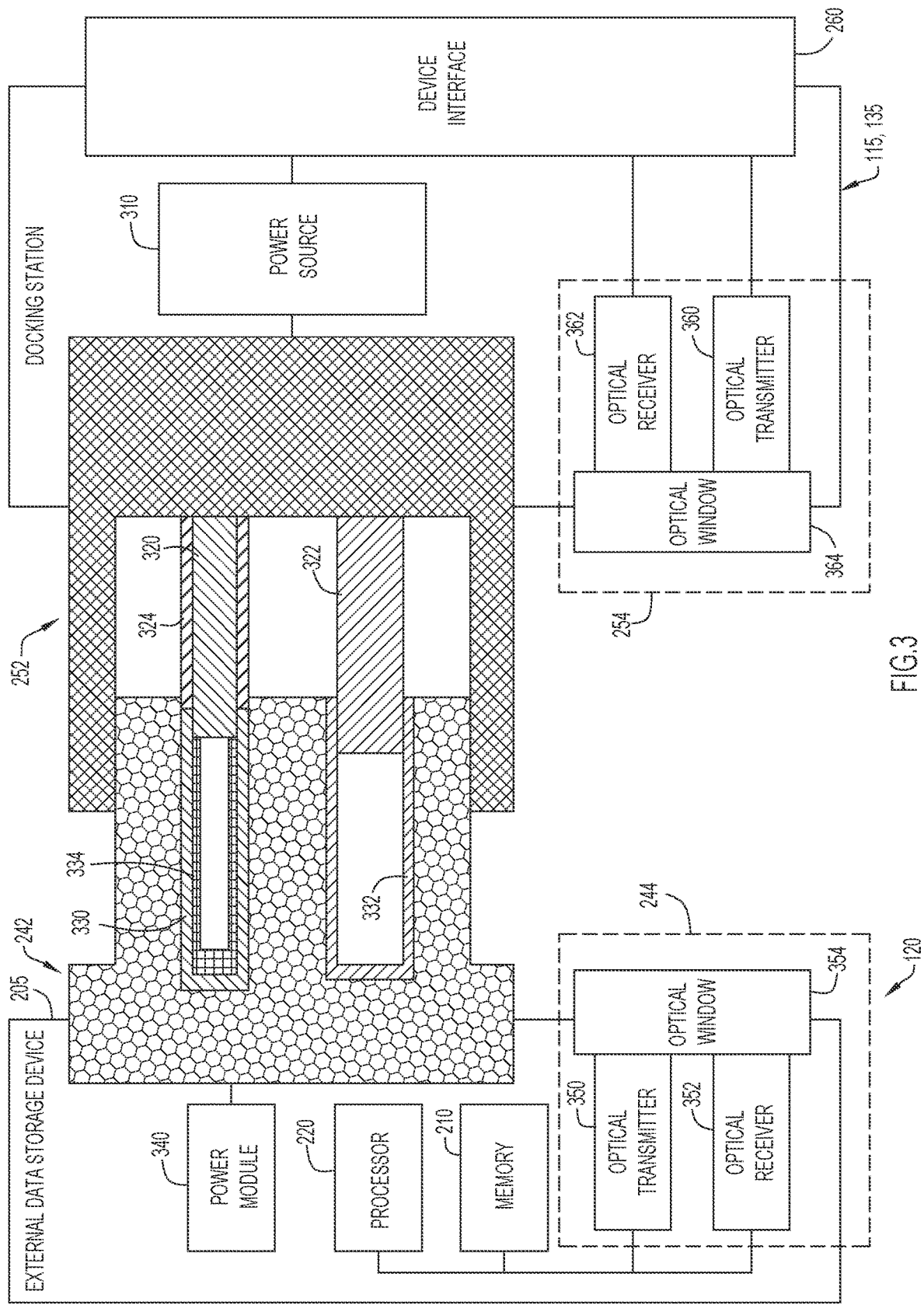
FIG. 3 is a block diagram of one example of mating electrical power connectors to allow data transfer in an underwater data storage system.

Referring now to FIG. 3, a simplified block diagram illustrates an example of the connectors assemblies with the power and data connections between the external data storage device 120 and the host docking station 115. The user docking station 135 includes similar features to the host docking station 115, and the configuration in FIG. 3 may also be used to establish a similar connection between the external data storage device 120 and the user docking station 135. The host docking station 115 includes a power source 310 to provide electrical power to the external data storage device 120 through the power contacts 242 and 252.

The power contact 252 on the host docking station 115 includes power pins 320 and 322. The power pin 320 is formed from a self-passivating material that forms an insulating passivation layer 324 when exposed to the underwater environment. The passivation layer 324 is typically non-reactive with the environment and protects the bulk of the material of the power pin 320 from further reactions with the environment. The passivation layer 324 prevents the power source 310 from driving a significant current between the power pins 320 and 322 in an electrolytic underwater environment. In another example, both of the power pins 320 and 322 may be constructed from a self-passivating material. The power pin(s) may be formed entirely of the self-passivating material or the power pin(s) may be formed with a coating of the self-passivating material over a base material that is not self-passivating.

Some examples of materials that are self-passivating in water include niobium, tantalum, titanium, zirconium, molybdenum, ruthenium, rhodium, palladium, hafnium, tungsten, rhenium, osmium, and iridium. Each of these materials react with water to form an electrically insulating passivation layer when exposed to a water environment. The passivation layer may be oxides, hydroxides, or other compounds that form by reacting the self-passivating material with an adverse environment. For instance, the self-passivating pin 320 may be niobium metal and the passivation layer 324 may be an oxide of niobium, such as $Nb_2O_5$.

The power contact 242 in the external data storage device 120 includes two power sockets 330 and 332 that mate with the power pins 320 and 322 in the host docking station 115. The power socket 330 is formed from a self-passivating material that forms an insulating passivation layer 334 when exposed to the underwater environment. In one example, both of the power sockets 330 and 332 may be constructed from a self-passivating material. The power socket(s) may be formed entirely of the self-passivating material or the power socket(s) may be formed with a coating of the self-passivating material over a base material that is not self-passivating.

In another example, the power socket 330 is formed from the same self-passivating material as the power pin 320. More specifically, in one example, the material used for the power pins 320 and 322 may be the same material used for power sockets 330 and 332, respectively. Dissimilar metals may also be used for power pin 320 and power socket 330 and/or power pin 322 and power socket 332 to reduce galling that can occur between similar metals when in sliding contact.

In yet another example, the power pin 320 may be an anodic contact and the power pin 322 may be a cathodic contact (e.g., based on a maintained voltage between the power pins 320 and 322). The anodic contact (e.g., power pin 320) may be formed from the self-passivating material, and the cathodic contact (e.g., power pin 322) may be formed from a different material. For instance, the cathodic contact may be made from a less expensive material, such as copper or a copper alloy.

In a further example, the action of mating the power contact 252 with the power contact 242 acts to physically scrape the passivation layers 324 and 334 from the power pin 320 and power socket 330, respectively, to bring the electrodes into good electrical contact with each other.

During the process of connecting the power contacts, the underwater environment may be expelled from the shrinking space between the respective electrodes and between the respective connector bodies through vent holes (not shown). However, there is no need to exclude the underwater environment as long as the form of the power contacts 242 and 252, power pins 320 and 322, and/or power sockets 330 and 332 allow for sufficient electrical contact between the respective electrodes.

The external data storage device 120 includes a power module 340 that receives the electrical power from the power source 310 through the power contacts 242 and 252, and distributes the electrical power to the components of the external data storage device 120 (e.g., memory 210, processor 220, and data transceiver 244). In one example, the power module 340 may adjust the characteristics (e.g., voltage, current, AC or DC, etc.) of the electrical power provided by the power source 310 to adapt to the requirements of the components of the external data storage device 120. In an embodiment, circuits for transferring AC power over the contacts, such as those described in U.S. Pat. No. 11,005,390, which is incorporated by reference herein, may be utilized. The power module 340 may include a battery or other type of power storage (e.g. supercapacitor) to enable the external data storage device 120 to operate for a limited time without receiving electrical power through the power sockets 330 and 332. For instance, the battery in the power module 340 may provide sufficient power to maintain data in the memory 210 if the memory 210 is volatile. The power module 340 may also include separate electrical components (e.g., processor, memory) from the external data storage device 120. Alternatively, the processor 220 and at least a portion of the memory 210 may be used to perform the functions of the power module 340.

The data transceiver 244 on the external data storage device 120 includes an optical transmitter 350 and an optical receiver 352 that send and receive optical signals through an optical window 354 in the housing of the external data storage device 120. Similarly, the data transceiver 254 on the host docking station 115 includes an optical transmitter 360 and an optical receiver 362 that send and receive optical signals through an optical window 364 in the housing of the host docking station 115. In some examples, the optical transmitter 350 and the optical receiver 352 may be combined into a single module that can send and receive optical signals.

When the external data storage device 120 is fully docked with the host docking station 115, the optical transmitter 350 may align with the optical receiver 362. Similarly, the optical transmitter 360 may align with the optical receiver 352 when the external data storage device 120 is fully docked with the host docking station 115.

The power contact 252 is shown in FIG. 3 as a two-pin electrical connector configured to mate with the power contact 242 (i.e., a two-socket electrical connector), but other configurations of power contacts may also be used with the techniques described herein. For example, the power contacts can have more than two pins. Additionally, the power contacts may include contacts in various shapes, e.g., blades, plates, blocks, posts, rungs, spades, clips, slots, coaxial connections, or combinations of the foregoing. Further, the power contacts may include both protruding contacts (e.g., pins, blades, etc.) and receiving contacts (e.g., sockets, slots, etc.) in the same electrical connector. In general, the techniques described herein may be applied to an electrical connector with power contacts in any combination of pins, holes, plates, slots, protrusions, or receptacles.

Figure 4:
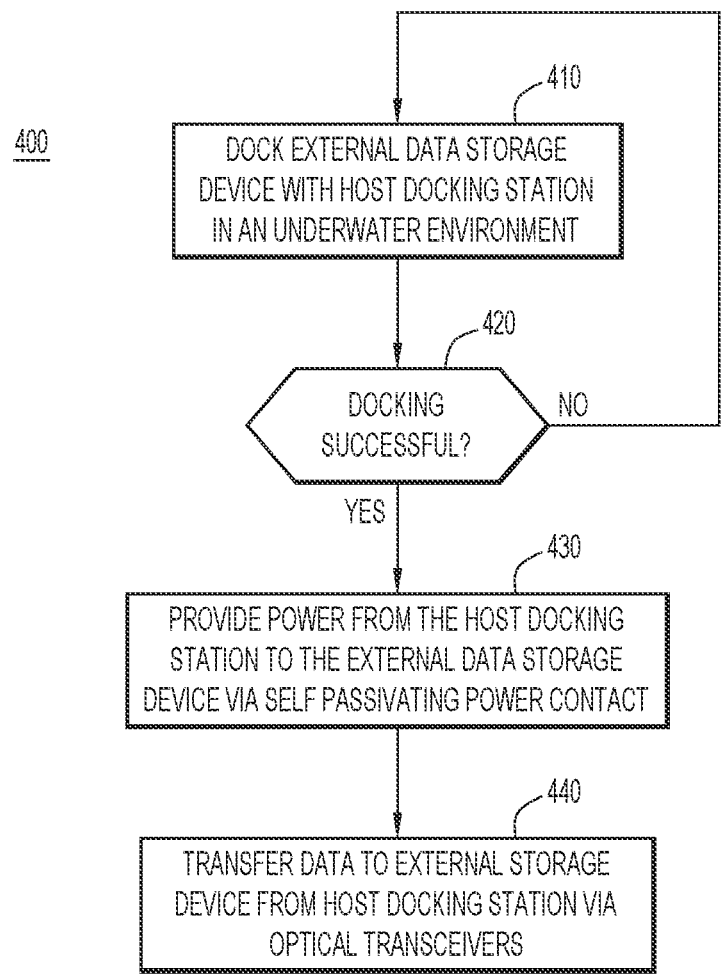
FIG. 4 is a flowchart of an example of a docking process for an underwater data storage device according to one embodiment.

Referring now to FIG. 4, a flowchart illustrates an example process 400 to retrieve data from an external data storage device (e.g., external data storage device 120) according to the techniques described herein. At 410, a user docks the external data storage device with a host docking station in an underwater environment. In one example, the host docking station is part of a host device, such as a sonar recording station, that resides in an undersea environment. In another example, the user docks the external data storage device with the host docking station by aligning one or more connectors on the external data storage device with complementary connectors on the host docking station. Components of the connecters may be made using self-passivating materials so that they may be exposed to the underwater environment during the docking process. Additionally, the docking process may include locking the external data storage device to the host docking station to prevent the external data storage device from disengaging from the host docking station.

At 420, the user determines whether the docking was successful. In one example, a successful docking may be indicated with an indicator on the host docking station or on the external data storage device. The indicator may provide visual or acoustic feedback to the user (e.g., flashing a light or producing an acoustic tone into the underwater environment). If the docking is not successful, the process returns to 410 to attempt to dock the external data storage device again.

If the docking is successful, then the host docking station provides electrical power to the external data storage device at 430. The host docking station provides the electrical power to the external data storage device through one or more self-passivating power contacts. In one example, the self-passivating power contacts form a passivation layer in the underwater environment, which may be abraded in the process of docking the external data storage device to the host docking station.

At 440, the host docking station transfers data to the external data storage device through the underwater environment via optical transceivers. In one example, the optical transceivers includes transmitters and receivers that allow for bidirectional communication between the external data storage device and the host docking station. For instance, the external data storage device may send instructions through the host docking station informing a host device of parameters of a subsequent data collection sequence, and the host device may send collected data from the previous data collection sequence.

In another example, the host docking station may transfer additional data over the power provided to the external data storage via the self-passivating contacts. For instance, the host docking station may superimpose a Radio Frequency (RF) signal over the electrical power provided via the self-passivating power contacts. The RF signal may be encoded to convey the additional data to the external data storage device.

The process 400 depicted in FIG. 4 illustrates one example of steps performed by a host docking station to dock and transfer data to an external data storage device. A similar process may be used to dock and transfer data between the external data storage device and a user docking station. Additionally, the process 400 may be included as part of a longer process to retrieve data collected at a host device and transfer the data to a user device in which the data may be further processed.

For instance, after the process 400 completes and the external data storage device has stored data (e.g., sonar data) collected by a host device, a user may return to the host device to remove the external data storage device with the collected data. The external data storage device may be replaced on the host docking station by a new external data storage device that will store data from a subsequent data collection process of the host device. The user may bring the external data storage device with the collected data to a user docking station and transfer the collected data to a user device that is configured to process the collected data.

In summary, the devices and techniques described herein provide for a self-passivating, high bandwidth, wet-mate connector that allows the system to break through the data transfer limit (e.g., 1 Gbps) imposed by traditional wet-mate connectors. With high transfer rates, the external data storage device is able to keep up with the undersea community's growing demand for greater amounts of data. Additionally, the nearly limitless number of rated matings for the self-passivating contacts enable a significantly longer working lifespan than traditional wet-mate connectors. Further, the capability for a user to change data transfer protocol for the external data storage device provides flexibility to adapt the data storage device to different host devices.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. For example, while the docking stations are described as having pins and the external data storage device is described as having mating sockets, it will be appreciated that the external data storage device may have pins and the docking stations may have mating sockets. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An underwater data storage system comprising:
   a docking station configured to operate in an underwater environment;
   a dockable external data storage device comprising a housing, a memory disposed within the housing to store data, and a connector assembly mounted on the housing, the connector assembly comprising:
   at least one optical transmitter configured to transfer data from the memory to a corresponding optical receiver in the docking station; and
   a self-passivating electrical contact configured to transfer electrical power to the dockable external data storage device from a power contact in the docking station, wherein dissimilar metals are used for the self-passivating electrical contact in the dockable external data storage device and the power contact in the docking station to reduce galling between similar metals when in sliding contact.

2. The underwater data storage system of claim 1, further comprising at least one indicator selected from the group consisting of a visual indicator and an acoustic indicator to indicate a successful docking operation between the dockable external data storage device and the docking station.

3. The underwater data storage system of claim 1, further comprising a locking mechanism to secure the dockable external data storage device to the docking station.

4. The underwater data storage system of claim 1, further comprising a data processor configured to adapt the data stored in the memory to a communication protocol associated with the docking station.

5. The underwater data storage system of claim 1, wherein the self-passivating electrical contact comprises an electrically conductive material that forms an electrically insulating passivation layer when exposed to the underwater environment.

6. The underwater data storage system of claim 5, wherein the electrically conductive material is selected from a group containing niobium, tantalum, titanium, zirconium, molybdenum, ruthenium, rhodium, palladium, hafnium, tungsten, rhenium, osmium, and iridium.

7. The underwater data storage system of claim 1, wherein the at least one optical transmitter is configured to transfer data to the corresponding optical receiver through the underwater environment.

8. A dockable external data storage device comprising:
   a housing configured to operate in an underwater environment;
   a memory disposed within the housing to store data; and
   a connector assembly mounted on the housing, the connector assembly comprising:
   at least one optical transmitter configured to transfer data from the memory to a corresponding optical receiver in a docking station; and
   a self-passivating electrical contact configured to transfer electrical power to the dockable external data storage device from a corresponding power contact in the docking station, wherein dissimilar metals are used for the self-passivating electrical contact in the dockable external data storage device and the power contact in the docking station to reduce galling between similar metals when in sliding contact.

9. The dockable external data storage device of claim 8, further comprising at least one indicator selected from a group consisting of a visual indicator and an acoustic indicator to indicate a successful docking operation between the dockable external data storage device and the docking station.

10. The dockable external data storage device of claim 8, further comprising a locking mechanism to secure the dockable external data storage device to the docking station.

11. The dockable external data storage device of claim 8, further comprising a data processor configured to adapt the data stored in the memory to a communication protocol associated with the docking station.

12. The dockable external data storage device of claim 8, wherein the self-passivating electrical contact comprises an electrically conductive material that forms an electrically insulating passivation layer when exposed to the underwater environment.

13. The dockable external data storage device of claim 12, wherein the electrically conductive material is selected from a group containing niobium, tantalum, titanium, zirconium, molybdenum, ruthenium, rhodium, palladium, hafnium, tungsten, rhenium, osmium, and iridium.

14. The dockable external data storage device of claim 8, wherein the at least one optical transmitter is configured to transfer data to the corresponding optical receiver through the underwater environment.

15. A method comprising:
    docking an external data storage device with a host docking station in an underwater environment;
    providing power to the external data storage device from a power contact in the host docking station via a self-passivating electrical contact, wherein dissimilar metals are used for the self-passivating electrical contact and the power contact to reduce galling between similar metals when in sliding contact; and
    transferring data to the external data storage device from the host docking station via optical transceivers.

16. The method of claim 15, further comprising confirming docking of the external data storage device with the host docking station with at least indicator selected from a group consisting of a visual indicator and an acoustic indicator to indicate a successful docking.

17. The method of claim 15, further comprising securing the external data storage device to the host docking station with a locking mechanism.

18. The method of claim 15, further comprising adapting the data stored in a memory of the external data storage device to a transport protocol associated with the host docking station.

19. The method of claim 15, further comprising:
    undocking the external data storage device from the host docking station; and
    docking the external data storage device to a user docking station in the underwater environment.

20. The method of claim 15, further comprising:
    undocking the external data storage device from the host docking station; and
    docking another external data storage to the host docking station in the underwater environment.

21. The method of claim 15, further comprising transferring additional data to the external data storage device from the host docking station by superimposing a data signal over the power provided via the self-passivating electrical contact.

* * * * *